Sept. 8, 1959 E. T. CARLSON ET AL 2,903,503
ELECTRICAL DISTRIBUTION SYSTEM
Filed Nov. 3, 1954 4 Sheets-Sheet 1
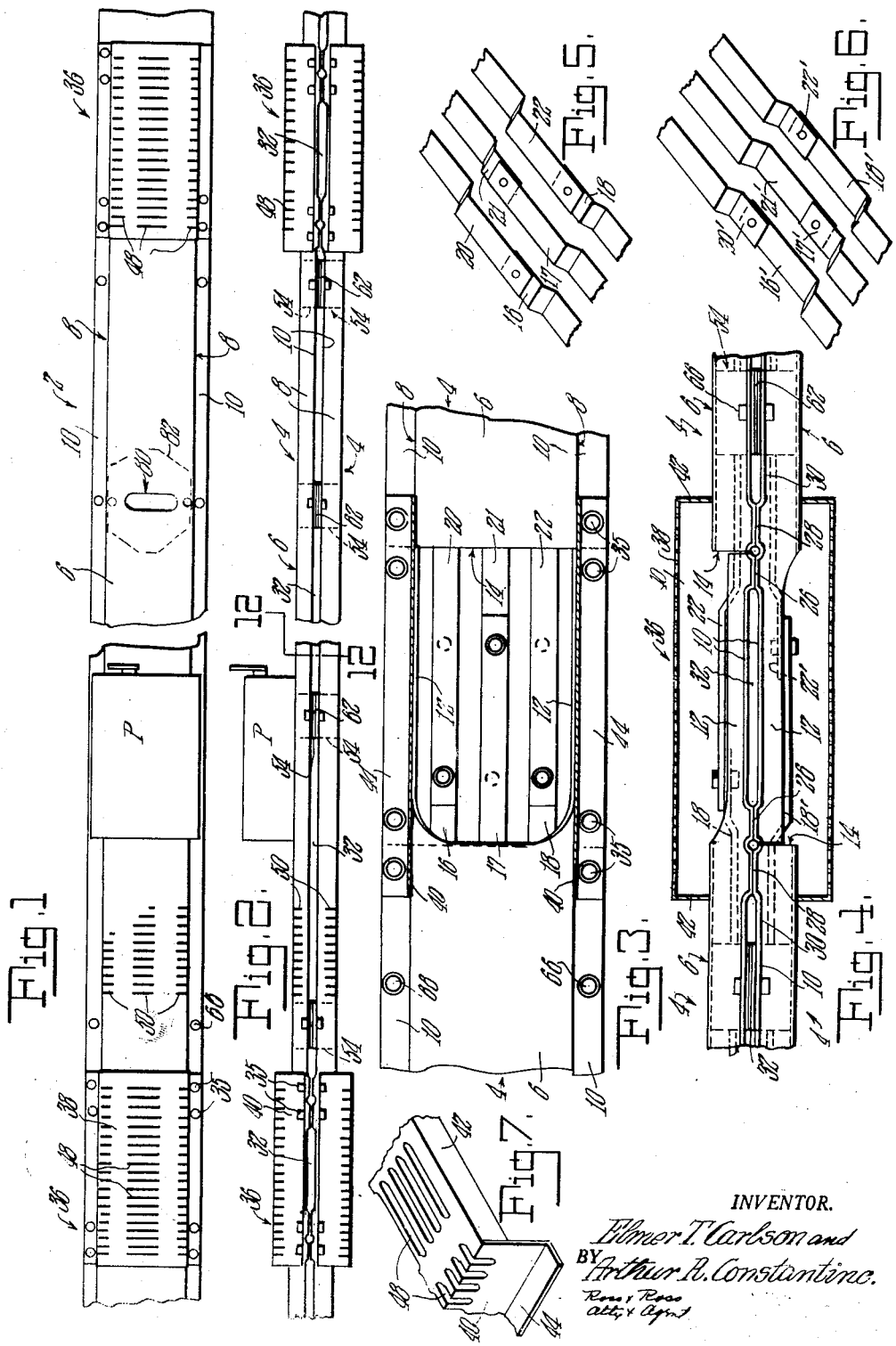
INVENTOR.
Elmer T. Carlson and
BY Arthur R. Constantino.
Ross & Ross
atty. & Agent

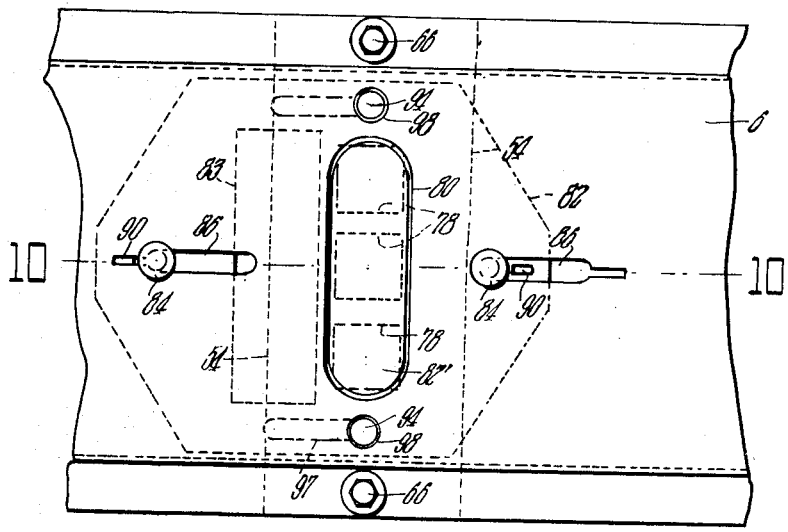
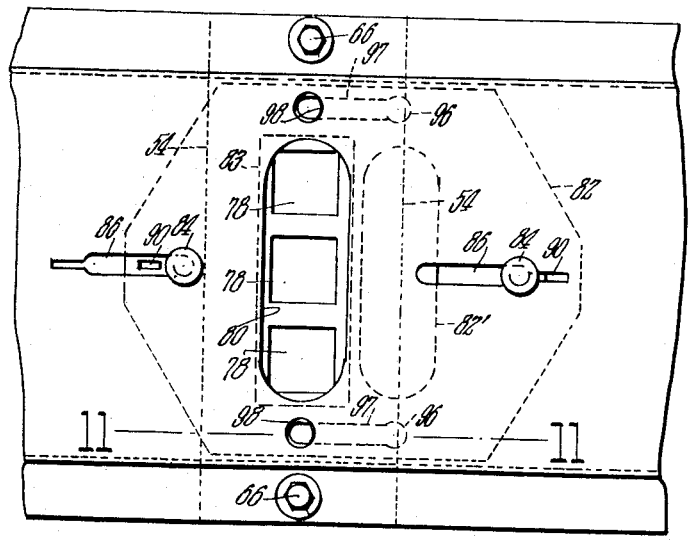
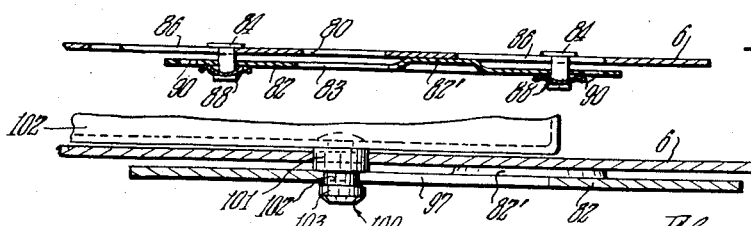

Sept. 8, 1959     E. T. CARLSON ET AL     2,903,503
ELECTRICAL DISTRIBUTION SYSTEM
Filed Nov. 3, 1954     4 Sheets-Sheet 3
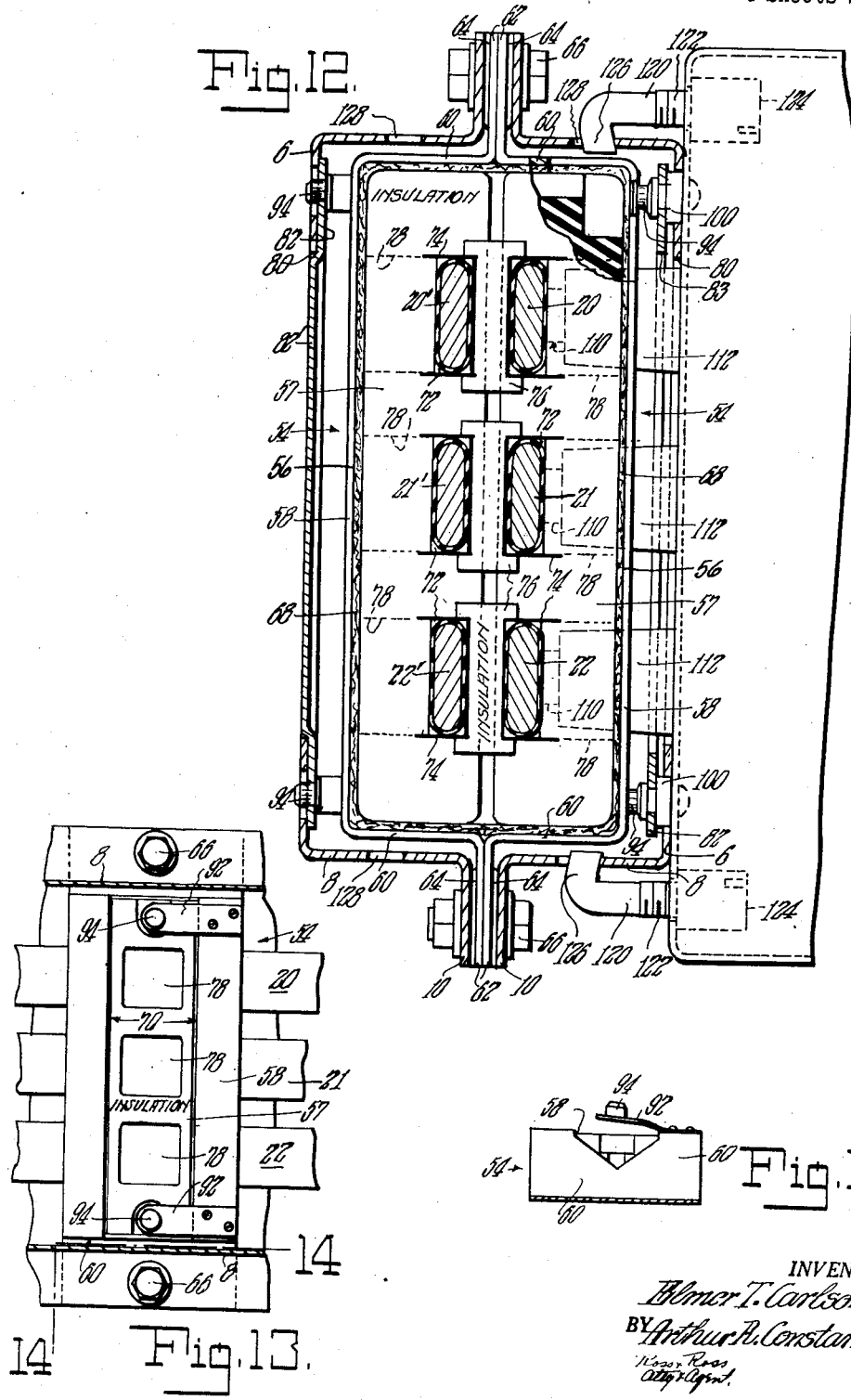
INVENTOR.
Elmer T. Carlson and
BY Arthur R. Constantine.

Sept. 8, 1959 E. T. CARLSON ET AL 2,903,503
ELECTRICAL DISTRIBUTION SYSTEM
Filed Nov. 3, 1954 4 Sheets-Sheet 4
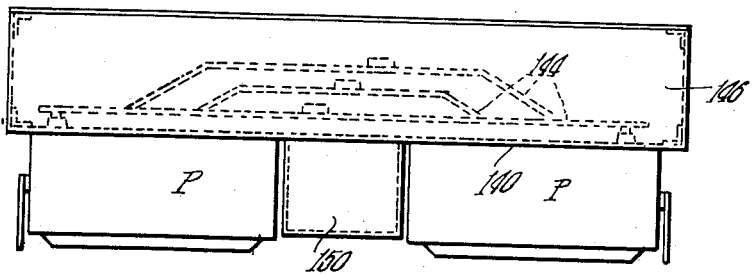
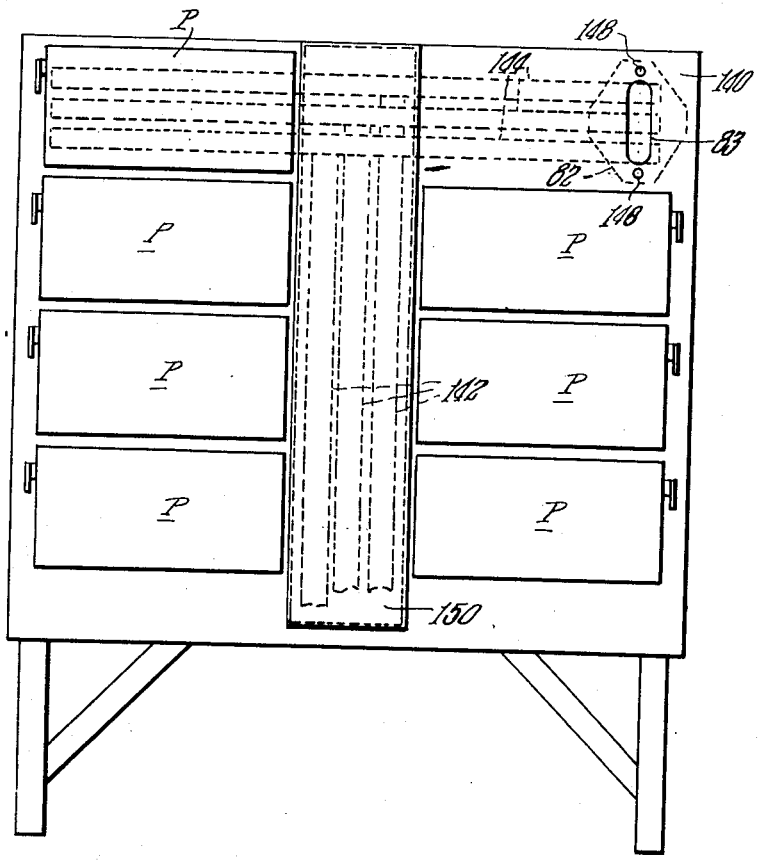
INVENTOR.
Elmer T. Carlson and
BY Arthur R. Constantine.

United States Patent Office

2,903,503
Patented Sept. 8, 1959

2,903,503

ELECTRICAL DISTRIBUTION SYSTEM

Elmer T. Carlson, New Britain, Conn., and Arthur R. Constantine, Longmeadow, Mass., assignors to Electric Machinery Mfg. Company, Minneapolis, Minn.

Application November 3, 1954, Serial No. 466,467

9 Claims. (Cl. 174—99)

This invention relates to electrical distribution systems and is directed more particularly to the type commonly referred to as busways including an elongated metal housing or duct having therein elongated electrical conductors or bus bars.

This application has been divided and claims relating to the connector-outlet combination are included in divisional application, Serial No. 558,028, filed January 9, 1956, for Electrical Distribution System.

The principal objects of the invention are the provision of an electrical transmission system constructed and arranged to avoid excessive voltage losses between the power source and load ends of circuits thereby to reduce power waste, provide the utmost operating efficiency from the available power, maintain costs at a minimum, and operate with maximum power factor.

Not only are conductor resistances of the system hereof proportioned to satisfy the current carrying requirements but the conductors or bus bars are arranged with wide faces in paired-phase relationship and uniformly close to one another for A.C. transmission and distribution.

It is well known that in A.C. distribution systems, the fluctuating magnetic fields surrounding conductors not only affect voltage drop but affect the distribution of current in the different conductors. Magnetic fields plus actual resistance results in a greater voltage drop in an A.C. system than in a D.C. system employing the same conductors.

In A.C. systems employing large capacity conductors the reactance is many times the resistance and even at relatively high power factors say 90 or 95 percent the reactance accounts for an appreciable portion of the voltage drop. The magnetic field in an A.C. system results in skin and proximity effects and a non-uniform distribution of current densities in the conductors. That is such skin and proximity effects crowd current into certain portions of conductors so that current is not distributed uniformly and thereby not only increasing resistance but increasing the heat generated relative to heat dissipated bringing about unfavorably high operating temperatures.

According to this invention the uniformly closely spaced bus-bars bring about the neutralization of magnetic fields and the elemination of skin and proximity effects so as to not only result in uniform distribution of current in the conductor cross sections and uniform heat generation throughout the bus bars but minimize energy loss all of which are desirable for efficient and low cost operation.

While reference is made to a system for A.C. distribution it will be understood that the novel features of the invention are applicable to D.C. distribution as well.

According to one feature of the invention an elongated housing is provided in which conductors or bus bars are supported in uniform relationship which are adapted to transmit current from a current source to points of distribution therealong for various load demands.

According to another feature of the invention duct sections are provided which are adapted for connection at opposite ends and so arranged that jointures are overlapped for strength and rigidity in a busway system.

According to a further feature of the invention the duct sections are formed from mating components which have elongated spaces between adjacent portions to facilitate the uniform flow of air laterally through the duct for cooling purposes and to enhance cooling, the duct structure is provided with an arrangement of apertures for the flow of air.

According to a further feature of the invention apertured housing means is provided to completely enclose connected together terminals of conductors of adjacent duct sections not only to provide protection but to facilitate cooling and ventilation.

The conductors are supported in the duct structure in such a manner and the connections between the terminals of conductors of adjacent sections are so arranged that very favorable distribution or transmission of electrical energy results with very low voltage drop as well as low impedance and without objectionable temperature rise whereby a very high degree of efficiency is attained.

As a still further feature of the invention protective means is provided to safeguard operating personnel against electrical shock, burns, falls and other injuries inherent to some degree at least in prior art distribution systems.

To that end supporting and insulating means for the conductors or bus bars is carried by pairs of metal plates which are secured within the duct. Said insulating means is provided with apertures for the passage of contactors therethrough which may extend through the duct and yieldingly and electrically make contact with the bus bars. The said supporting and insulating means are so formed and secured within the duct therealong in such a manner as to maintain the conductors in uniformly spaced and paired-phase relationship.

The duct is provided with openings through which the contactors may extend and safety plates normally extend across and close said openings. Said plates are releasably locked in closed postion and are unlocked for movement to open position by means associated with a plug-in box having contactors to be projected into contact with the bus bars. Thus with the safety plates releasably locked in closed position access to the bus bars is prevented. Said safety plates may be moved to open position only as a plug-in box is connected and locked to the duct by the safety plate. When so locked the contactors may be projected into contact with the bus bars. To release a plug-in box the safety plate is moved to closed position and may not be moved to closed position until the contactors have been retracted by the plug-in box.

A form of plug-in box is that shown in our copending application and as the description proceeds it will be apparent that the safety features hereof are applicable to a panel, wall or any other structure having bus bars associated therewith with which contactors are to be engaged.

All of the above cited objects we accomplish by means of such structure and relative arrangement of parts thereof, as will fully appear by a perusal of the description below and by various specific features which will be hereinafter set forth.

To these above and other ends and with the foregoing and various other and ancillary features and advantages and objects of our invention as will become more readily apparent as the description proceeds, our invention consists in certain features of novelty, in a mode of operation, and in the combination, organization, and arrangement of parts as will be hereinafter more particularly pointed out in the claims hereunto annexed and more fully described and referred to in conjunction with the accompanying drawings wherein:

Figs. 1 and 2 are side elevational and inverted plan views of a duct construction embodying the novel features of the invention;

Fig. 3 is a side elevational view of adjacent ends of adjacent duct sections connected together;

Fig. 4 is an inverted plan view of the duct sections in Fig. 3 with the housing in section;

Figs. 5 and 6 are perspective diagrammatic views of the terminals of two sets of bus bars in adjacent duct sections as they are related when connected together;

Fig. 7 is a fragmentary view of a housing for the jointure of duct sections;

Fig. 8 is an elevational view of a wall of the duct showing a safety locking plate associated therewith and in its closed position;

Fig. 9 is a view similar to Fig. 8 with the safety plate in its open position;

Fig. 10 is a sectional view on the line 10—10 of Fig. 8;

Fig. 11 is a sectional view on the line 11—11 of Fig. 9;

Fig. 12 is a sectional view on the line 12—12 of Fig. 2 showing one of the supporting and insulating devices for conductors associated with the duct;

Fig. 13 is a side elevational view of one of the insulator supports for the bus bars shown in Fig. 12;

Fig. 14 is a sectional view on the line 14—14 of Fig. 13 to show one of the locking means for the safety plate;

Fig. 15 is an elevational view of a panel to further illustrate certain features of the invention;

Fig. 16 is a plan view of the panel shown in Fig. 15.

Referring now to the drawings in detail the novel features of the invention will be described.

A duct section 2 is formed by a pair of elongated metal channel members 4 having outer walls 6, side walls 8 and side flanges 10.

Each channel forming a duct section has a portion of the outer wall 6 at one end cut away as shown in Figs. 3 and 4. The channels of a pair forming a duct section are arranged so that the cut away end portion and the squared ends are at opposite ends of the section. This is so that extensions 12 at the cut away ends of the channels of duct sections overlap one another and abut the square end 14 of an adjacent channel as shown. By cutting away the wall 6 of the channels there is provided openings for access to the terminals of the bus bars or conductors associated with the duct sections. Said bus bars are supported in the duct sections as will hereinafter appear.

The bus bar terminals of one duct section are represented by 16, 17, 18 and 16', 17', 18'. Terminals 20, 21, 22 and 20', 21', 22' are those of the adjacent duct section. It will be noted that the terminals of one set of bus bars of both duct sections are offset outwardly in one direction and that the terminals of the other section are offset in an opposite direction. The overlapping portions of the extensions are bolted together as shown and being offset there is ample room therebetween for securing by bolts or other means.

As seen with particular reference to Fig. 4 the flanges 10 are contiguous at spaced points such as at 26 and 28, to provide spaces 32 therebetween. That is the flanges are contiguous for securing the channels together while at the same time the spaces therebetween are provided for the flow of air for cooling purposes.

Housings 36 are formed from sheet metal to have outer walls 38, side walls 40, end walls 42 and flanges 44. The housings overlie the openings of the duct sections and the flanges of the housings and of the duct channels are secured by bolts or screws indicated by 35 to provide a strong rigid structure. Thus by the housings and duct sections the connected together bus bar terminals are entirely enclosed.

The duct will normally be supported in such a manner that the walls 6 are substantially in vertical planes whereby the spaces 32 between the flanges are along lower and upper sides of the duct. In this way there may be a flow or circulation of air upwardly through the duct for its cooling effect on the bus bars.

The housings are provided with apertures 48 in the walls thereof. Likewise the walls of the duct are provided with apertures indicated by 50 all of which enhances the flow of air for the desired cooling effect.

Means for supporting and insulating the bus bars will now be described with particular reference to Figs. 12, 13, and 14.

Such means is indicated generally by 54 and each consists of a pair of similar metal brackets 56 and a pair of insulators 57. Each bracket 56 is formed in the shape of a U to have an outer side 58, and end walls 60 having flanges 62. The flanges 62 carry bosses 64 and are disposed in the spaces between the flanges 10 of the duct section channels. The brackets and flanges are secured by bolts 66, as shown.

The insulators 57 are confined within the brackets 54 there being a layer of yieldable material 68 therebetween which may be felt or the like.

The supporting and insulating means are spaced along the duct sections and system to adequately support the conductors and maintain the desired uniform relationship.

The brackets are slotted at 70, as shown in Fig. 13, and outer portions of the insulators fit therein. Adjacent inner faces of the insulators 57 are provided with spaced grooves 72 which on their inner sides and ends are lined with somewhat thin insulating material 74. The conductors 20 to 22 and 20' to 22' extend through the slots 72 of the insulators and insulating blocks 76 are disposed between the insulators 57 and adjacent sides of the bus bars. Thus the bus bars are securely held against displacement and the brackets are securely held by the duct.

As will be observed the bus bars are arranged with flat inner faces in relatively close and paired-phase relationship for the before mentioned advantages.

As previously stated the bus bars will be engaged by contactors for which purpose the insulators are provided with openings 78 extending therethrough to the bus bars. As shown the bus bars may be encased in insulating material except where they are to be engaged by a contactor.

The walls 6 of the duct sections are provided with elongated openings 80 which are disposed over the openings 78 of the insulators and safety plate means is provided as shown in Figs. 8 and 9. One such plate is indicated by 82 and rivets 84 or the like of said plate are slidable in slots 86 of wall 6.

Said plate 82 is provided with a displaced portion 82' which seats in the opening 80 in closed position thereof. Spring washers 88 on inner ends of rivets 84 urge the plate 82 to the wall 6. Plate 82 is provided with an elongated opening 83 arranged to permit access to the bus bars in open position of the plate. Openings 90 in plate 82 are provided for a screw driver or the like to facilitate manual movement of said plate between the closed position and open positions shown in Figs. 8 and 9. However, the plate 82 is releasably held against movement from closed position by means shown in Figs. 13 and 14.

Leaf springs 92 secured to the outer sides 58 of the brackets 56 carry buttons 94. With the plate 82 in the closed position shown in Fig. 8 the action is such that the buttons 94 extend into enlarged ends 96 of slots 97 of the plate and prevent movement thereof to open position.

The wall 6 is provided with openings 98 over said buttons for receiving studs 100 of a plug-in box 102. Said stud 100 as shown in Fig. 11 has a body 101, a reduced neck 102 and an end 103 smaller than the body. The openings 98 of wall 6 are of a diameter to suitably receive the body 101 of the stud. The end 103 of the stud is of a diameter for insertion in the enlarged end 96 of slot 97 of the plate. As stud 100 is inserted in and pressed through opening 98 of the wall the smaller end 103 of the stud depresses the spring pressed button 94 and the body 101 of the stud depresses plate 82 slightly against the spring washers. The neck 102 of the stud being in the slot 97 of plate 82 said plate may be moved from closed position of Fig. 8 to open position of Fig. 9. The stud is locked to the wall by means of the end 103 of the stud which underlies plate 92 and is of greater diameter than the transverse width of slot 97. Thus a plug-in box having studs, as described, may be locked. The studs and thereby a box carrying the studs is released by sliding the plate to closed position whereupon the ends 103 of the studs may be withdrawn through the large ends 96 of slots 97. On withdrawal buttons 94 enter and close the large ends 96 of slots 97 and lock the plate 82 against movement.

Plug-in box a portion of which is designated by P has contactors 110 disposed in members 112 which are movable between a retracted and extended conductor contacting positions by mechanism associated with the box. Said box is provided with studs 100 already described.

With the contactors 110 in retracted position and locking plate 82 in closed position the studs are inserted in the holes 98 of the duct. Unless the contactors are retracted they will abut the locking plate to prevent insertion of the studs.

As the studs are inserted the locking plate is released for movement to open position during which it locks the studs and box to the duct, as explained.

When so locked the contactors are extended so that they pass through opening 80 of the duct and openings 78 of the insulator 57 into contact with the conductors. To release the box the contactors are retracted since otherwise the plate cannot be moved to closed position to release the studs.

It will be understood that similar plug-in boxes may be connected to and locked in position on opposite sides of the duct so as to make circuits with paired-phase conductors. Also it will be noted that plug-in boxes may be locked in connection with the duct at various points therealong to meet various load requirements.

Other locking means for securing a plug-in box to a wall such as the wall of a duct is shown in Fig. 12.

Bolts 120 have inner threaded ends 122 which extend loosely through the wall of the box. Nuts 124 in threaded engagement therewith draw the bolts inwardly. Outer hook ends 126 of the bolts engage in openings 128 provided in walls 8 of the duct. The nuts may be tightened so that the box is pulled against wall 6. The bolts cooperate with locking means engaging the studs to secure the box in place.

According to the invention a wall may have the locking means associated therewith so that a plug-in box may be connected thereto for the contactors thereof to make contact with bus bars rearwardly of said wall.

For illustrative purposes a panel is represented by 140 in Figs. 15 and 16. Bus bars 142 extend upwardly at the rear of the panels and conductors or bus bars 144 connected thereto extend in groups outwardly therefrom. Said bus bars are enclosed in a housing 146 at the rear of the panel.

The panel is provided with openings such as 83 to permit contactors of plug-in boxes P to make contact with the bars 144. Holes 148 are provided for studs of the plug-in box which have been described.

Slidable lock plates such as 82 previously described are provided at the rear of the panel. These plates will be operable in conjunction with the studs of the plug-in box to releasably lock the box to the panel.

There may be provisions for as many circuits and plug-in boxes as may be desired and an enclosure 150 on the forward side of the spaces for the boxes is provided to accommodate cables from the boxes.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description and all modifications and variations as fall within the meaning and purview and range of equivalency of the appended claims are therefore intended to be embraced therein.

What it is desired to claim and secure by Letters Patent of the United States is:

1. A duct construction comprising in combination, duct sections, formed from channels, the channels of each section having outer and opposite side walls provided with flanges, the outer walls of the channels at opposite ends of the section being cut away to provide extensions of said side walls and flanges at opposite ends of each section, the flanges of the channel of one section overlying the flanges of an adjacent channel of an adjacent section whereby the said cut away portions provide openings at opposite sides of the duct, housing means enclosing said openings, portions only of said flanges of the channels being in contiguous secured relation to provide spaces between said flanges for flow of air into and out of said duct, electrical conducting means and supporting means therefor in said duct.

2. Duct construction set forth in claim 1, wherein said electrical conducting means includes sets of elongated conductors having terminations in said openings which are secured together.

3. Duct construction set forth in claim 1, wherein said conducting means includes sets of elongated conductors having terminations in said openings which are connected, with the terminations of said sets being offset away from one another and the securing means of the sets of conductors being relatively offset.

4. Means for supporting elongated bus bars comprising in combination, a pair of rigid bracket members in the form of C's facing toward one another, having outer and opposite ends directed toward one another and flanges extending in substantial parallelism therefrom at opposite sides of the brackets, and a pair of opposed cooperating insulating members within said brackets and grooves on adjacent inner faces thereof and spaced therealong for receiving sets of conductors, said brackets and insulating members being provided with aligned openings therethrough into said grooves for contactors in contact with conductors in said grooves.

5. Means for supporting elongated bus bars comprising in combination, substantially rigid opposed bracket means having opposite and adjacent side and end walls and flanges at opposite ends thereof, the flanges being side by side and parallel, a pair of opposed cooperating insulating members in said bracket means having corresponding grooves on inner adjacent sides and elongated bus bars therein, said grooves being arranged to hold said bus bars in sets of pairs thereof in close relation, said bracket means having openings in said side walls and said insulating members having openings aligned with the openings in the bracket means extending through the insulating members into said grooves for contactors to engage said bus bars.

6. A bus duct construction comprising in combination, elongated channel members having side and end walls and flanges along said end walls, the channel members facing toward one another and having their flanges adjacent, substantially rigid bracket means within the channel members having opposite and adjacent side and end walls and flanges at opposite ends thereof which extend between the flanges of the channels, means for securing the channels and bracket means together, a pair of opposed cooperating insulating members held in said bracket means, having separate grooves on inner spaced and adjacent sides, elongated relatively flat conductors in said grooves, the conductors having their major cross sectional dimension in the direction of the major cross sectional dimension of the channel members, said grooves being arranged to locate said conductors in sets of pairs thereof in closely spaced relation, said side walls of the bracket means and said insulating members having openings for conductors to engage the sides of said elongated relatively flat conductors.

7. A bus duct construction set forth in claim 6, in combination with means for closing and opening the openings in the insulating means.

8. A bus duct construction set forth in claim 6, wherein the walls of the bracket means and channels are spaced apart and the flanges of the channels are spaced apart for flow of air into the duct around the bus bars and out of the duct.

9. A bus duct section, comprising in combination a pair of channel sections each having outer and side walls provided with flanges, the flanges of the channels having portions in contiguous relation to provide spaces for flow of air into and out of said section, conductors of generally rectangular section having their elongated cross-sectional sides parallel to one of the sides of the channel sections, the conductors extending through the interior of the channel sections, there being an access opening in one of the channel sections cooperating with the conductors, insulating means holding the conductors in insulated spaced relation from the channel sections, butt contacts admitted through the access opening and engaging conductors at the relatively long sides in abutting relation, and means for closing and opening the access opening in said one of the channel sections.

References Cited in the file of this patent
UNITED STATES PATENTS

| | | |
|---|---|---|
| 2,009,376 | Frank | July 23, 1935 |
| 2,262,627 | Whitesell et al. | Nov. 11, 1941 |
| 2,263,211 | Harvey et al. | Nov. 18, 1941 |
| 2,407,142 | Cole et al. | Sept. 3, 1946 |
| 2,552,061 | Popp | May 8, 1951 |
| 2,610,999 | Silver | Sept. 16, 1952 |
| 2,626,301 | Hammerly | Jan. 20, 1953 |
| 2,653,991 | Dyer | Sept. 29, 1953 |
| 2,666,907 | Hensley | Jan. 19, 1954 |